Patented Apr. 11, 1933

1,903,708

UNITED STATES PATENT OFFICE

ALFRED PONGRATZ AND ALOIS ZINKE, OF GRAZ, AUSTRIA, ASSIGNORS TO FELICE BENSA, OF GENOA, ITALY

PROCESS FOR MANUFACTURING VAT DYESTUFFS OF THE PERYLENE SERIES

No Drawing. Application filed April 6, 1929, Serial No. 353,249, and in Austria January 9, 1929.

The invention relates to a process for manufacturing vat dye stuffs of the perylene series and consists essentially in that the chloride of perylene 3,9 dicarboxylic acid is condensed with amino quinones of the anthracene or perylene series. In this way there is obtained a series of vat dye stuffs which dye cotton in light yellow to full brown colours. The condensation is effected by simple heating of the constituents in nitrobenzene.

The vat dye stuffs of the present invention may be represented by the following formula:

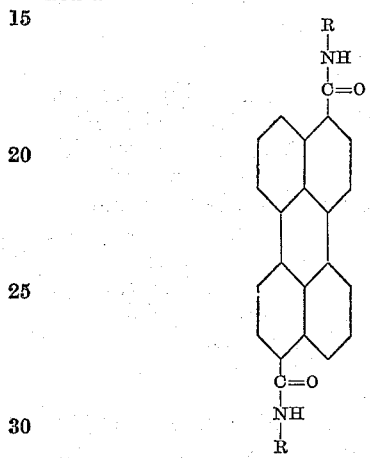

where —NH—R is an amino substitution product of a compound selected from the following group:— anthraquinone, perylene quinone. It is clear from the fomula that one hydrogen atom of an amino group of an amino anthraquinone or an amino perylene quinone has been replaced by the nucleus set forth. Hereinafter in the specification claims where the formula is recited and described as above, this substitution or replacement of one hydrogen atom of an amino group is to be understood.

Example I 1 part by weight of $\beta$ amino anthraquinone is dissolved in 50 parts by weight of nitro benzene and to this solution a suspension of 1 part by weight of chloride of perylene 3,9 dicarboxylic acid in 20 parts by weight of nitrobenzene is gradually added at a temperature of about 180° centigrade. The reaction begins immediately after the addition, the dye stuff formed separates while still hot in yellowish brown needles. After a heating lasting about 15 minutes the reaction is completed. After cooling the product is filtered and washed with nitrobenzene and alcohol. As a result there are formed small flat needles of a yellowish brown colour which are soluble in concentrated sulphuric acid with a brown colour, which are soluble with difficulty in nitro-benzene and aniline with a yellow colour, and which are practically insoluble in xylene, toluene and the like. The colour of the vat is brown. Cotton absorbs the vat with the same colour and after exposure to air its colour becomes yellowish orange.

The dye stuff resulting from the example just given has a formula which may be expressed as follows:

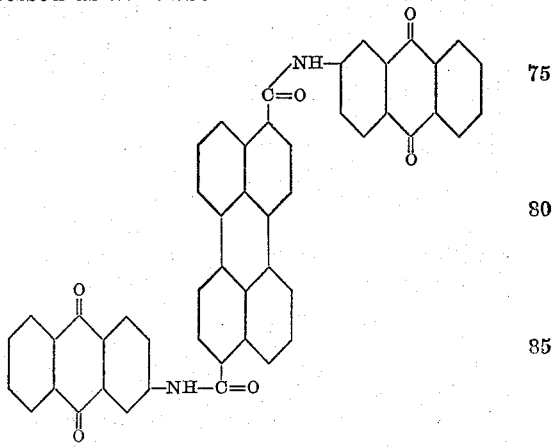

If instead of $\beta$ amino anthraquinone $\alpha$ amino anthraquinone is used, there is obtained a dye stuff dyeing with a light brown colour, 1,2 diamino anthraquinone gives a dye stuff dyeing in gold brown colour.

Where $\alpha$ amino anthraquinone is used instead of $\beta$ amino anthraquinone the formula is analogous to that given above.

Example II 1 part by weight of 1 chloro-4 amino anthraquinone is dissolved in 50 parts by weight of nitro-benzene and at a temperature of about 180° centigrade a suspension of 1 part by weight of chloride of perylene 3.9 dicarboxylic acid is gradually added. The reaction takes a similar course to that described in Example I and the dye stuff is obtained in the form of a yellowish brown powder.

The formula of this dye stuff may be expressed as follows:

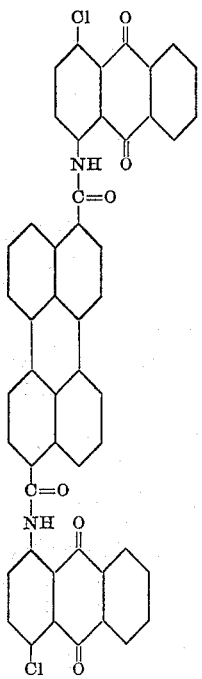

In concentrated sulphuric acid the dye stuff dissolves with a blue colour, in nitrobenzene and aniline it is difficultly soluble with a brown colour, in xylene, benzene and the like it is scarcely soluble. The vat is of a dark brown colour, cotton takes up with a brown colour, on exposure to air the colour turns into gold orange.

1 chloro 2 amino anthraquinone condensed with chloride of perylene 3,9 dicarboxylic acid gives a dye stuff dyeing cotton in light yellow colours.

*Example III*

1 part by weight of diamino perylene quinone is dissolved in 200 parts by weight of nitrobenzene and at a temperature of about 190° centigrade a suspension of 3 parts by weight of chloride of perylene, 3,9 dicarboxylic acid in 30 parts by weight are gradually added. After about 15 minutes the reaction is completed and after filtering one obtains the crude dyestuff in the form of a dark brown powder which if desired, is treated with dilute ammonia for removing remainders of perylene 3,9 dicarboxylic acid. The dye stuff dissolves in concentrated sulphuric acid with a red colour, it is difficultly soluble in nitro benzene aniline and the like the solutions being of a brown colour. The colour of the vat is reddish brown, cotton takes up with the same colour, on exposure to air one obtains a full deep brown.

The dye stuff obtained in the example which has just been given has a formula:

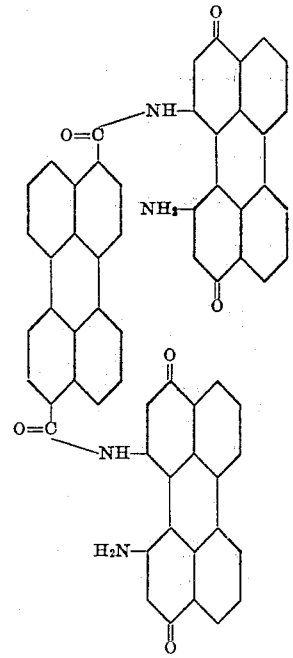

What we claim is:

1. A process for manufacturing vat dye stuffs of the perylene series comprising the step of heating in nitrobenzene, the chloride of perylene 3,9 dicarboxylic acid with an amino substitution product selected from the following group: anthraquinone, perylene quinone.

2. A process for manufacturing vat dye stuffs of the perylene series comprising the step of heating in nitrobenzene the chloride of perylene 3,9 dicarboxylic acid with diamino perylene quinone.

3. A process for manufacturing vat dye stuffs of the perylene series comprising the step of heating in nitrobenzene, the chloride of perylene 3,9 dicarboxylic acid with a diamino substitution product selected from the following group:—anthraquinone, perylene quinone.

4. A process for manufacturing vat dye stuffs of the perylene series comprising the step of heating in nitrobenzene, the chloride of perylene 3,9 dicarboxylic acid with a chloroamino substitution product of a compound selected from the following group:— anthraquinone, perylene quinone.

5. A process for manufacturing vat dye stuffs of the perylene series comprising the step of heating in nitrobenzene, the chloride of perylene 3,9 dicarboxylic acid with an amino anthraquinone.

6. A process for manufacturing vat dye stuffs of the perylene series comprising the step of heating in nitrobenzene, the chloride of perylene 3,9 dicarboxylic acid with a chloro amino anthraquinone.

7. As a new article of manufacture, a vat dye stuff comprising a compound of the following formula:

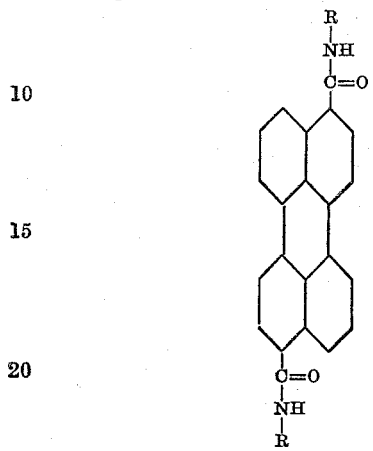

where —NH—R is an amino substitution product of a compound selected from the following group:—anthraquinone, perylene quinone.

8. The product of claim 7 where —NH—R is an amino substitution product of a compound selected from the following group:—anthraquinone, perylene quinone.

9. The product of claim 7 where —NH—R is a chloro-amino substitution product of a compound selected from the following group:—anthraquinone, perylene quinone.

10. The product of claim 8 where —NH—R is amino perylene quinone.

11. The product of claim 9 where —NH—R is a chloro amino anthraquinone.

12. The product of claim 10 where —NH—R is diamino perylene quinone.

In testimony whereof we have affixed our signatures.

ALFRED PONGRATZ.
ALOIS ZINKE.